(12) United States Patent
Fronczak et al.

(10) Patent No.: US 8,588,393 B2
(45) Date of Patent: *Nov. 19, 2013

(54) CALLING PARTY NAME PROVISIONING

(75) Inventors: Lawrence J. Fronczak, Marlton, NJ (US); Jeffrey R. Evans, Lovettsville, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 266 days.

This patent is subject to a terminal disclaimer.

(21) Appl. No.: 12/982,410

(22) Filed: Dec. 30, 2010

(65) Prior Publication Data

US 2011/0096772 A1 Apr. 28, 2011

Related U.S. Application Data

(63) Continuation of application No. 11/692,301, filed on Mar. 28, 2007.

(51) Int. Cl.
*H04M 3/42* (2006.01)

(52) U.S. Cl.
USPC .............. 379/201.12; 379/142.16; 379/93.23; 379/142.01; 709/220; 709/221; 709/223

(58) Field of Classification Search
USPC ............... 379/142.16, 93.23, 142.01, 201.12; 709/220, 221, 223, 224
See application file for complete search history.

(56) References Cited

U.S. PATENT DOCUMENTS

| | | |
|---|---|---|
| 7,272,133 B2 | 9/2007 | Valin et al. |
| 2003/0235279 A1 | 12/2003 | Richomme |
| 2005/0143135 A1 | 6/2005 | Brems et al. |
| 2006/0165068 A1 | 7/2006 | Dalton et al. |
| 2007/0140299 A1 | 6/2007 | Hofmann et al. |
| 2008/0063168 A1 | 3/2008 | Haley et al. |

*Primary Examiner* — Joseph J Nguyen

(57) ABSTRACT

A system may receive a telephone call request for a Voice over Internet Protocol (VoIP) user. The telephone call request omits a name of a calling party. The system may further determine if the VoIP user has a calling party name feature enabled and obtaining, when the VoIP user has a calling party name feature enabled, the name of the calling party from a Public Switched Telephone Network (PSTN) based repository of calling party names.

19 Claims, 7 Drawing Sheets

CALLING PARTY NAME PROVISIONING

RELATED APPLICATION

This application is a continuation of U.S. patent application Ser. No. 11/692,301, filed Mar. 28, 2007, which is incorporated herein by reference.

BACKGROUND INFORMATION

The calling party name feature is a Class 5 subscribed feature in the Public Switched Telephone network (PSTN). Incoming telephone calls to a subscriber's line may first query the appropriate Line Information Database (LIDB) for the calling party's name before terminating the telephone call. In the Session Initiation Protocol (SIP) domain, calling name information is typically provided, along with the calling number, for incoming telephone calls. This calling party name provisioning may be achieved by inserting the call originator's name in the Display-name field of the From or Remote-Party-Identifier (ID) header of the initial Invite message. For telephone calls originating in the PSTN and destined for the SIP domain, calling name information is typically not included.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
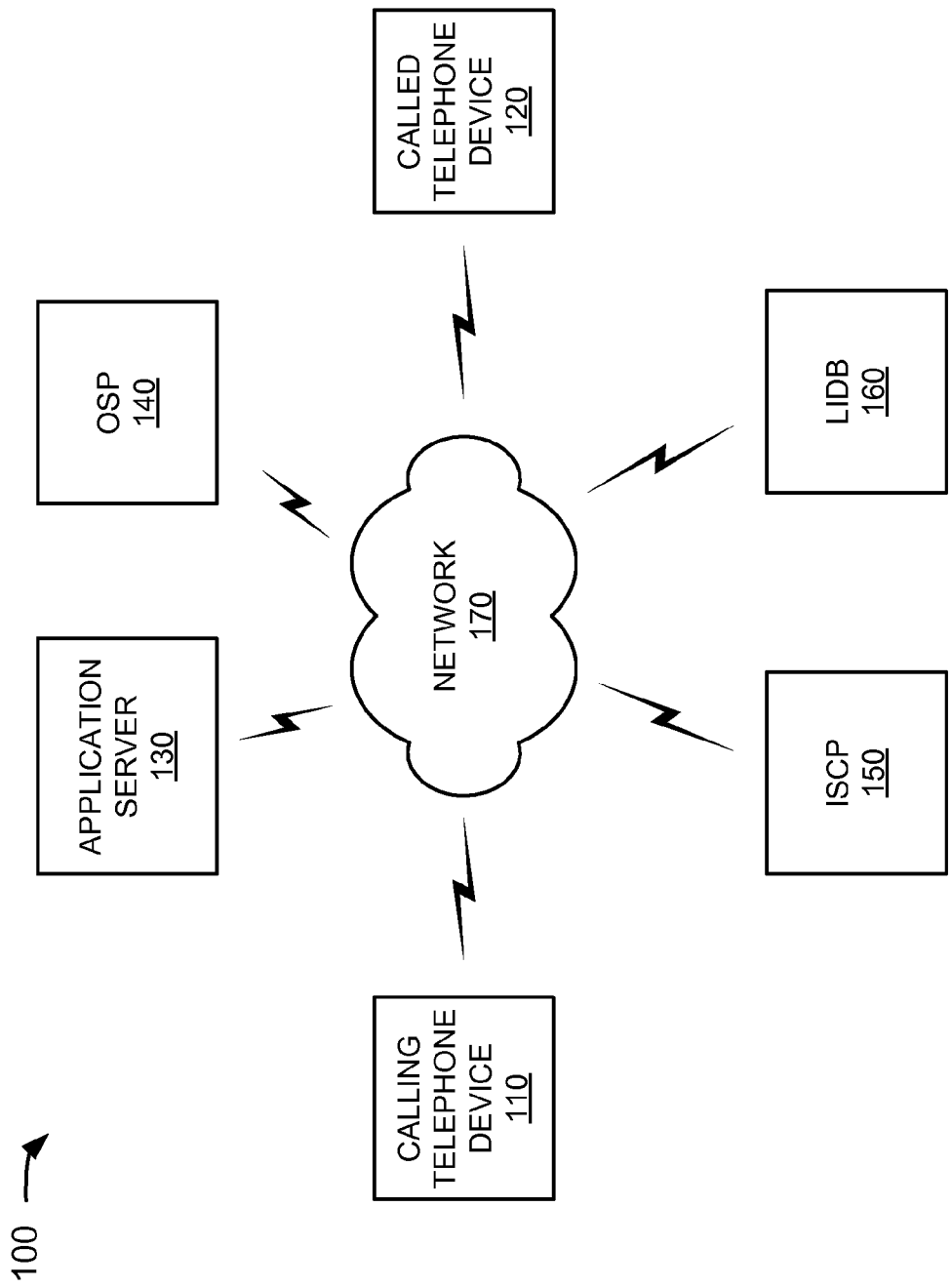
FIG. 1 is an exemplary network in which systems and methods described herein may be implemented.

FIG. 1 is an exemplary network in which systems and methods described herein may be implemented. As illustrated, network 100 may include a calling telephone device 110, a called telephone device 120, an application server 130, an open services platform (OSP) 140, an integrated service control point (ISCP) 150, and a line information database (LIDB) 160 that may connect together via a network 170. The number of calling telephone devices 110, called telephone devices 120, application servers 130, OSPs 140, ISCPs 150, LIDBs 160, and networks 170 illustrated in FIG. 1 is provided for simplicity. In practice, there may be more calling telephone devices 110, called telephone devices 120, application servers 130, OSPs 140, ISCPs 150, LIDBs 160, and networks 170. Moreover, it will be appreciated that one or more devices in FIG. 1 may perform the functions of one or more other devices illustrated in FIG. 1.

Calling telephone device 110 may include one or more devices capable of transmitting and/or receiving voice communications over a Public Switched Telephone Network (PSTN) or other similar type of network. For example, calling telephone device 110 may include a plain old telephone system (POTS) telephone or a similar type of telephone device.

Called telephone device 120 may include one or more devices capable of transmitting and/or receiving voice communications over a data network, such as the Internet. For example, called telephone device 120 may include a Session Initiation Protocol (SIP) telephone, an analog telephone (e.g., a plain old telephone system (POTS) phone), a computer device (e.g., a personal computer, a laptop, a personal digital assistant, etc.), and/or another type of device capable of transmitting and/or receiving voice communications, such as Voice over Internet Protocol (VoIP) telephone calls, over a data network.

Application server 130 may include a server entity that routes telephone calls to called telephone devices, such as called telephone device 120. An entity may be defined as a device, such as a computer or another type of computation or communication device, a thread or process running on one of these devices, and/or an object executable by one of these devices. In one embodiment, application server 130 may obtain calling party name information for an incoming telephone call and send the calling party name information to called telephone device 120.

OSP 140 may provide one or more call services. OSP 140 may include, for example, one or more media gateways, media servers, and/or signaling gateways. In one embodiment, OSP 140 may forward calling party name information requests and responses to the appropriate network devices.

ISCP 150 may include one or more devices that provide routing instructions for a telephone call. In one embodiment, ISCP 150 may query a database for calling party name information and forward query responses to the appropriate network device(s).

LIDB 160 may include a database that contains subscriber information. In exemplary embodiments, LIDB 160 may act as a repository of calling party name information. In one embodiment, LIDB 160 may be a PSTN-based repository.

Network 170 may include a network of any type, including a Public Land Mobile Network (PLMN), a PSTN, a local area network (LAN), a metropolitan area network (MAN), a wide area network (WAN), a private network, the Internet, an intranet, etc. In one embodiment, network 170 may include a PSTN and a data network, such as the Internet. The devices in FIG. 1 may connect to network 170 via wired and/or wireless connections.

Figure 2:
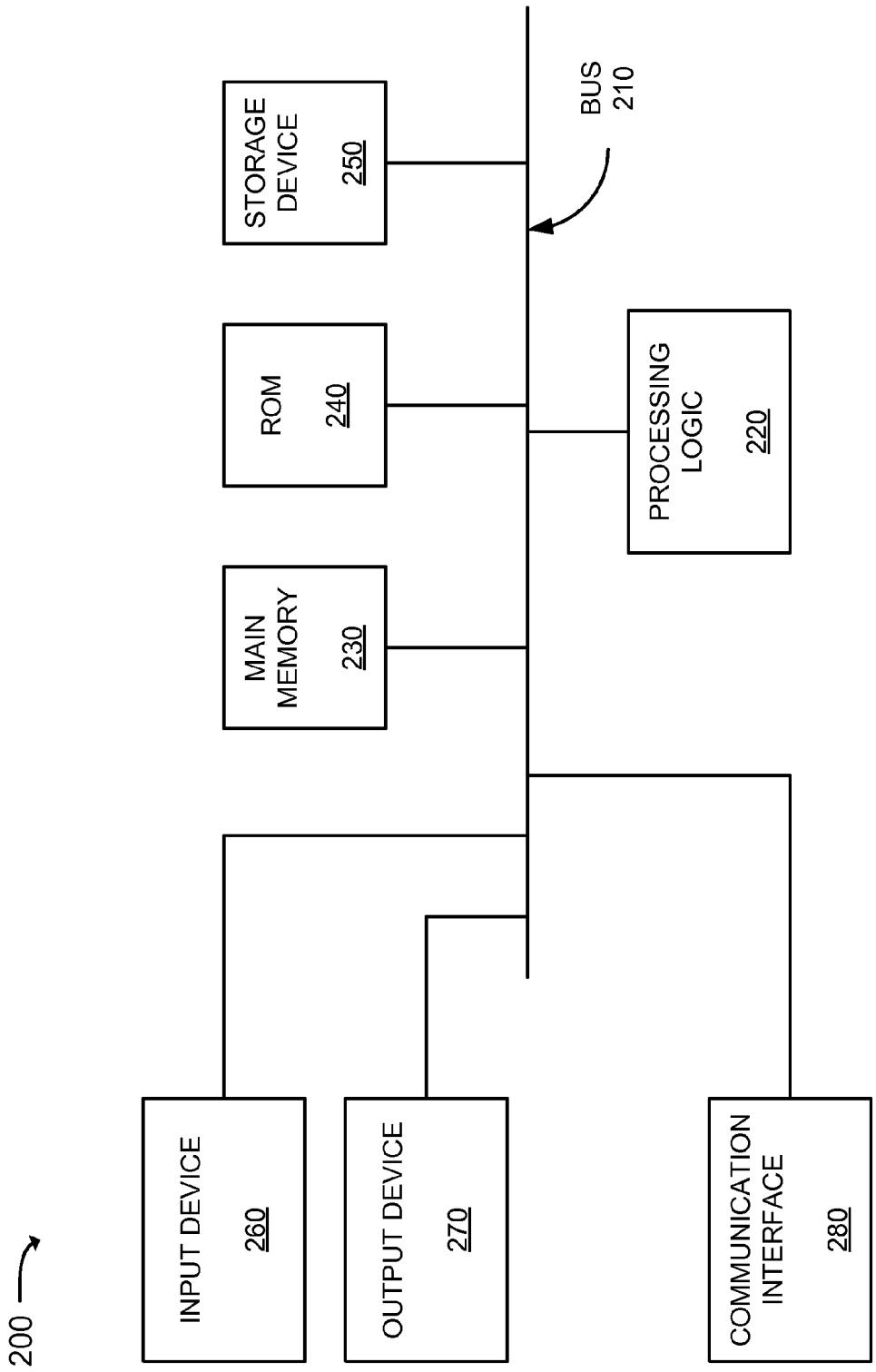
FIG. 2 is an exemplary diagram of a network device according to an exemplary embodiment.

FIG. 2 is an exemplary diagram of a network device 200 according to an exemplary embodiment. Network device 200 may correspond, for example, to called telephone device 120, application server 130, OSP 140, and/or ISCP 150. As illustrated, network device 200 may include a bus 210, processing logic 220, a main memory 230, a read only memory (ROM) 240, a storage device 250, an input device 260, an output device 270, and a communication interface 280. It will be appreciated that network device 200 may include additional (or other) components than illustrated in FIG. 2.

Bus 210 may include a path that permits communication among the elements of network device 200. Processing logic 220 may include a processor, microprocessor, or other type of processing logic, such as an application specific integrated circuit (ASIC), field programmable gate array (FPGA), etc., that may interpret and execute instructions. Main memory 230 may include a random access memory (RAM) or another type of dynamic storage device that may store information and instructions for execution by processing logic 220. ROM 240 may include a ROM device or another type of static storage device that may store static information and instructions for use by processing logic 220. Storage device 250 may include a magnetic and/or optical recording medium and its corresponding drive.

Input device 260 may include a mechanism that permits an operator to input information to network device 200, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables network device 200 to communicate with other devices and/or systems via a network, such as network 170.

As will be described in detail below, network device 200 may perform certain operations. Network device 200 may perform these operations, and other operations, in response to processing logic 220 executing software instructions contained in a computer-readable medium, such as main memory 230. A computer-readable medium may be defined as a physical or logical memory device and/or carrier wave.

The software instructions may be read into main memory 230 from another computer-readable medium, such as storage device 250, or from another device via communication interface 280. The software instructions contained in main memory 230 may cause processing logic 220 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

Figure 3:
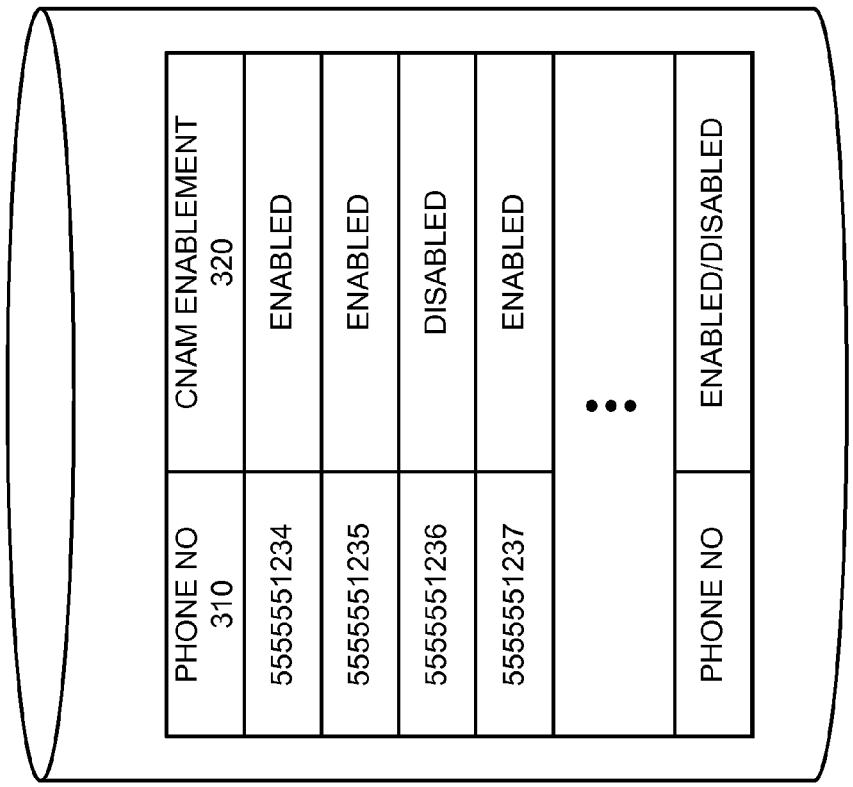
FIG. 3 is a portion of an exemplary database that may be associated with the application server of FIG. 1.

FIG. 3 is a portion of an exemplary database 300 that may be associated with application server 130. While only one database is described below, it will be appreciated that database 300 may consist of multiple databases stored locally at application server 130, or stored at one or more different and possibly remote locations.

As illustrated, database 300 may maintain a group of entries in the following exemplary fields: phone number (NO) field 310 and calling name (CNAM) enablement field 320. Database 300 may maintain additional information (not shown) that aids application server 130 in processing incoming telephone calls.

Phone number field 310 may store a telephone number associated with a subscriber, such as a subscriber associated with called telephone device 120. The telephone number may be represented as a numeric or alphanumeric sequence of characters. For example, as illustrated in FIG. 3, database 300 may store the telephone number 5555551234 that may be associated with a subscriber.

Calling name enablement field 320 may store information indicating whether a calling name feature is enabled for the subscriber associated with the telephone phone number identified in phone number field 310. When the calling name feature is enabled, the name of a calling party may be provided to the subscriber's called telephone device. When the calling name feature is disabled, the name of a calling party may not be provided to the subscriber's called telephone device.

Figure 4:
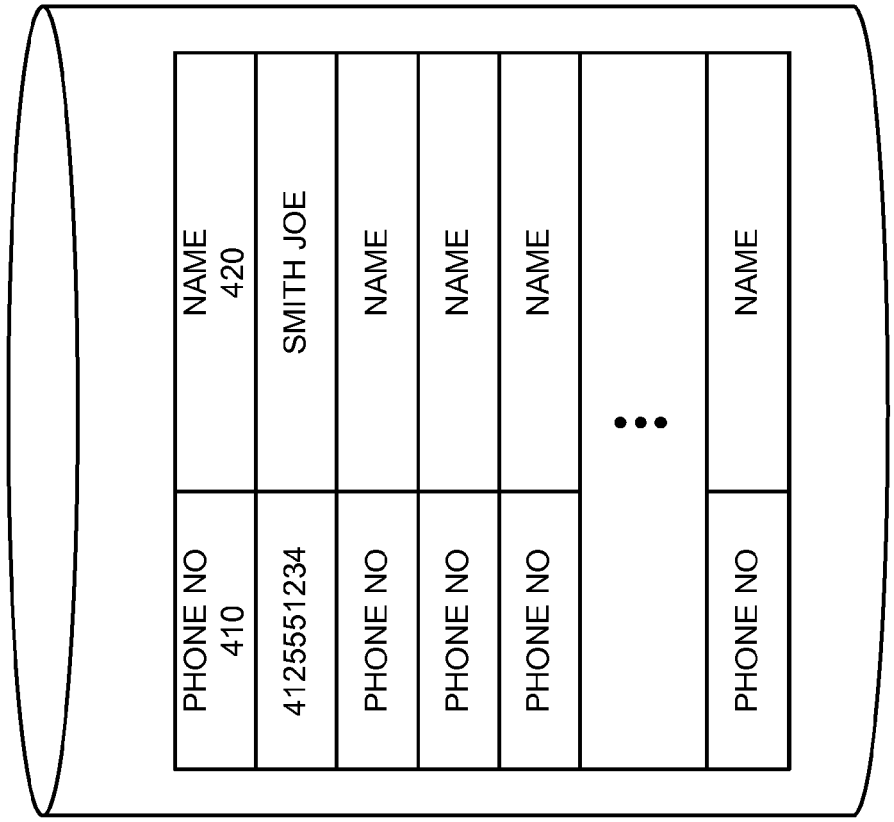
FIG. 4 is an exemplary diagram of the line information database (LIDB) of FIG. 1.

FIG. 4 is an exemplary diagram of LIDB 160. While only one database is described below, it will be appreciated that LIDB 160 may consist of multiple databases stored locally at LIDB 160, or stored at one or more different and possibly remote locations.

As illustrated, LIDB 160 may maintain a group of entries in the following exemplary fields: a phone number field 410 and a name field 420 LIDB 160 may maintain additional information (not shown) that aids LIDB 160 in providing calling party name information to called telephone devices, such as called telephone device 120.

Phone number field 410 may store a telephone number associated with a calling party, such as a party associated with calling telephone device 110. For example, as illustrated in FIG. 4, LIDB 160 may store the telephone number 4125551234 that may be associated with a calling party.

Name field 420 may store information identifying a name of a party associated with the telephone number identified in phone number field 410. Name field 420 may store names in a first name/last name format, a last name/first name format (as illustrated in FIG. 4), and/or in some other format. In the example illustrated in FIG. 4, "SMITH JOE" may be associated with telephone number 4125551234.

Figure 5:
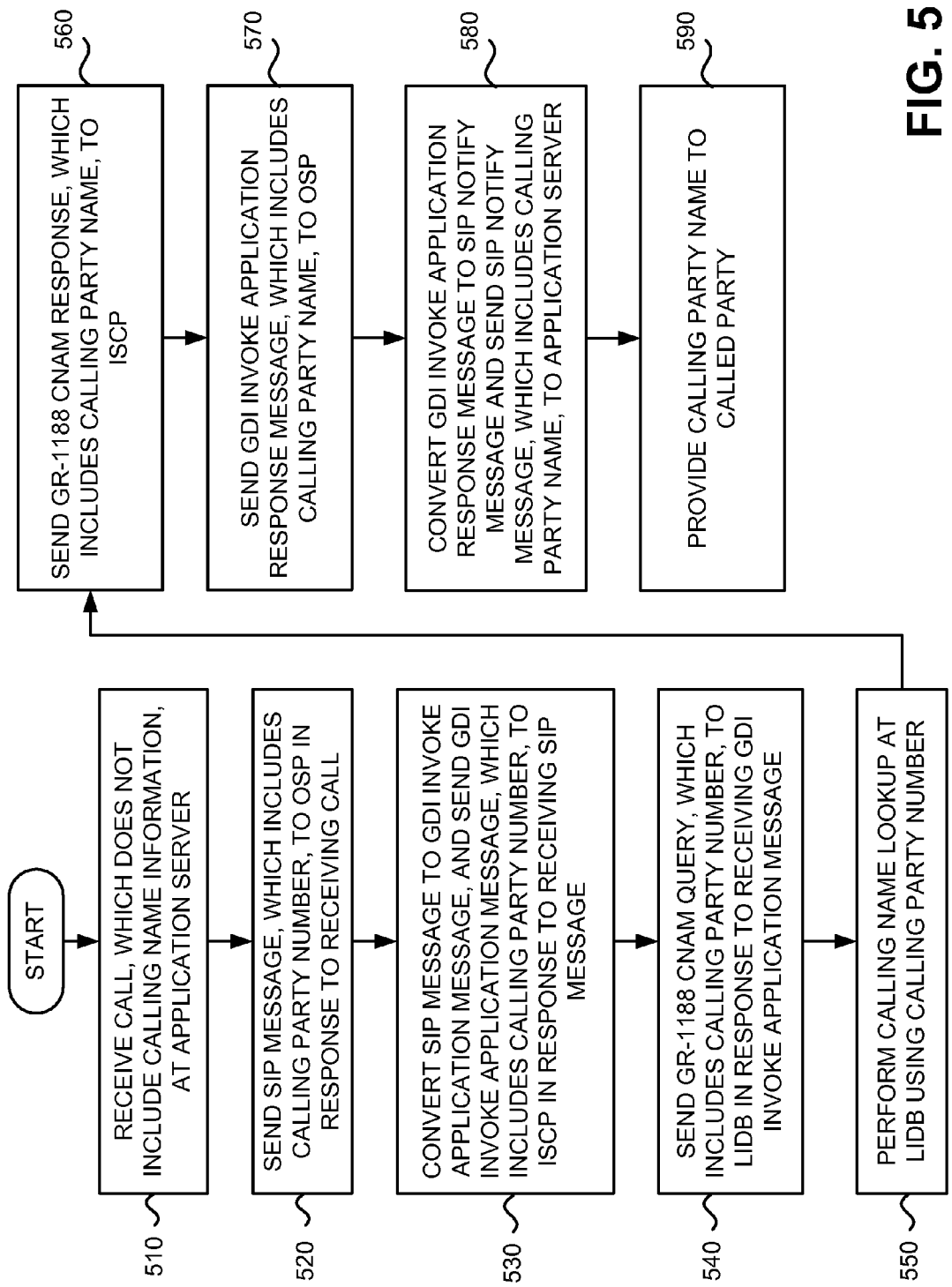
FIG. 5 is a flow chart of exemplary processing for providing calling name information according to exemplary embodiments.
Figure 6:
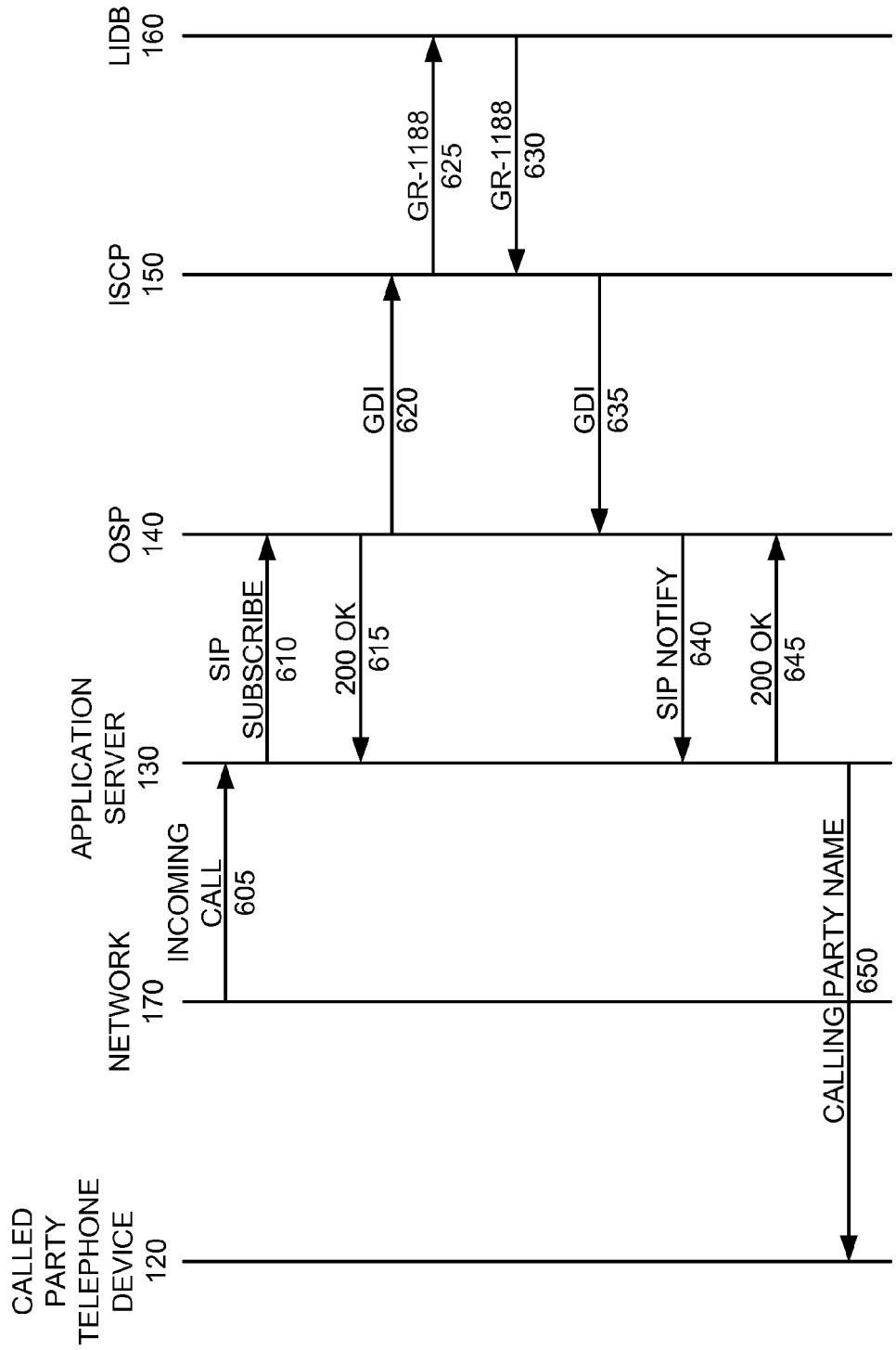
FIG. 6 is an exemplary call flow diagram corresponding to the processing described above with respect to FIG. 5.

FIG. 5 is a flow chart of exemplary processing for providing calling name information according to exemplary embodiments. The processing of FIG. 5 will be described in relation to the call flow diagram illustrated in FIG. 6. Processing may begin with application server 130 receiving an incoming telephone call 605 for a subscriber associated with a called telephone device, such as called telephone device 120 (block 510). For the processing described herein, it is assumed that incoming telephone call 605 does not include calling name information. In response to receiving incoming telephone call 605, application server 130 may determine whether the calling name feature is enabled for the subscriber. For example, application sever 130 determine whether the calling name feature has been enabled by looking up the information in database 300. If the calling name feature is not enabled for the subscriber, application server 130 may forward incoming telephone call 605 to called telephone device 120.

If the calling name feature is enabled for the subscriber, application server 130 may send a SIP SUBSCRIBE message 610 (or another type of SIP or non-SIP message) to OSP 140 requesting calling name information for the calling party (block 520). SIP SUBSCRIBE message 610 may include a telephone number associated with the calling party. SIP SUBSCRIBE message 610 may include the following exemplary format:

---

SUBSCRIBE sip:osp.com SIP/2.0
Via:SIP/2.0/UDP as.example.com:5060;branch=z9hG4bK-BroadWorks.192.168.1.60-192.168.1.60V5060-0-703070627-536157426-1045083194181;event=calling-name
From: <sip:as.example.com>;tag=536157426-1045083194181
To: <sip:osp.com>
Call-Id: 1349882@cnam-lookup.example.com
CSeq: 703070627 SUBSCRIBE
Contact: <sip:as.example.com>
Expires: 0
Event: calling-name;id=6
Content-Type: application/calling-name-info
Content-Length: 116
Max-Forwards:10
Calling-party:sip:+14125551234@as.example.com;user=phone
Called-party:sip:+15555551237@as.example.com;user=phone.

---

As illustrated in this exemplary message, SIP SUBSCRIBE message 610 may include a calling name event type indication (which is "calling-name;id=6" in the above example). SIP SUBSCRIBE message 610 may further include calling party information and called party information. The calling party information may include the calling party SIP Uniform Resource Identifier (URI) as identified by application server 130. The SIP-URI for the calling party may include a dial number in E.164 format (or another format) for the user part, the IP address of application server 130, and a user=phone parameter. The called party information may include the called party SIP-URI as identified by application server 130. The SIP-URI for the called party may also include a dial number in E.164 format (or another format) for the user part, the IP address of application server 130, and a user=phone parameter.

As an alternative to sending a SIP SUBSCRIBE message, application server 130 may send another type of message. For example, in another embodiment, application server 130 may send an eXtensible Markup Language (XML) structure over Hyper Text Transfer Protocol (HTTP) or another transfer protocol. The XML structure may include some or all of the above information described as being included in SIP SUBSCRIBE message 610. It will be appreciated that other messaging protocols may alternatively be used.

In response to receiving SIP SUBSCRIBE message 610, OSP 140 may transmit a "200 OK" message 615 to application sever 130 to acknowledge receipt of SIP SUBSCRIBE message 610. "200 OK" message 615 may include the following exemplary format:

```
SIP/2.0 200 OK
Via:SIP/2.0/UDP networkdevice.example.com:5060
From: <sip:osp.com>tag=78923
To: <sip:as.example.com>;tag=536157426-1045083194181
Call-Id: 1349882@cnam-lookup.example.com
CSeq: 20 NOTIFY
Content-Length: 0.
```

Further in response to receiving SIP SUBSCRIBE message 610, OSP 140 may generate and send a Generic Data Interface (GDI) Invoke Application message 620 (or another type of message), which includes the calling party telephone number, to the appropriate ISCP, such as ISCP 150 (block 530). In one exemplary embodiment, OSP 140 may invoke a SIP servlet that converts SIP SUBSCRIBE message 610 into GDI Invoke Application message 620 upon detection of the calling name event package in SIP SUBSCRIBE message 610. In one embodiment, the SIP servlet may process incoming SIP SUBSCRIBE message 610 in a "Fetch mode" (e.g., the SIP servlet may identify that the Expires field in SIP SUBSCRIBE message 610 has been set to "0," which requests a single SIP NOTIFY message with the calling name information). In one embodiment, the SIP servlet may be a Java-based servlet. In those situations where application server 130 sends an XML structure over HTTP (as opposed to a SIP SUBSCRIBE message), OSP 140 may convert the XML structure to GDI Invoke Application message 620. The conversion of the XML structure to GDI Invoke Application message 620 via, for example, a mapping processing.

ISCP 150 may receive GDI Invoke Application message 620 from OSP 140 and may launch a calling name query 625 (e.g., in the form of a GR-1188 calling name (CNAM) query or another type of query) to LIDB 160 (block 540). GR-1188 CNAM query 625 may include the calling party telephone number.

In one embodiment, service logic in ISCP 150 may use a receiving call variable mapping table to map a tag value from GDI Invoke Application message 620 to a call variable value in GR-1188 CNAM query 625. In another embodiment, the receiving call variable mapping table may include the following exemplary fields: an application name field, an action identifier field, a received system identification field, a tag identifier field, and a call variable name field. In other embodiments, the receiving call variable mapping table may include different or additional fields.

The application name field may identify the application within ISCP 150 to which the message is directed. The action identifier field may identity the particular action requested (e.g., calling party name lookup). The received system identification field may identify the server (e.g., ISCP 150 or logic within ISCP 150) to which GDI Invoke Application message 620 is directed. The tag identifier field may store a value of a tag that may be included in an incoming GDI Invoke Application message 620. The calling variable name field may store a value to be included in an outgoing GR-1188 query 625. For example, if the values of the application name, the action identifier, and the receiving system identifier of an incoming GDI Invoke Application message 620 match the values in the application name field, the action identifier field, and the received system identification field, respectively, of the receiving call variable mapping table, ISCP 150 may update the calling variable name field for that particular entry in the receiving call variable mapping table with the tag value from the incoming GDI Invoke Application message 620. ISCP 150 may thereafter generate GR-1188 CNAM query 625 using the call variable name value.

In response to receiving GR-1188 CNAM query 625, LIDB 160 may perform a calling party name lookup based on the calling party telephone number (block 550). For example, LIDB 160 may identify a particular entry in LIDB 160 using the calling party telephone number and identify a calling party name based on the calling party telephone number. If the calling party telephone number is not contained in LIDB 160, LIDB 160 may send an error message to ISCP 150. The error message may include the following information:

```
Calling-Name-Status: unavailable
Calling-Name: "error"
<sip:+14125551234@as.example.com; user=phone>
Presentation-Indicator: error.
```

If the calling party telephone number is contained in LIDB 160, LIDB 160 may send the calling party name (e.g., as part of a GR-1188 CNAM response message 630 or another type of message) to ISCP 150 (block 560). If, on the other hand, LIDB 160 contains the calling party name, but the calling party name is marked as private, LIDB 160 may notify ISCP 150 that the name restricted. For example, LIDB 160 may send the following information to ISPC 150:

```
Calling-Name-Status: available
Calling-Name: "SMITH JOE"
<sip:+14125551234@as.example.com; user=phone>
Presentation-Indicator: restricted.
```

In response to receiving the calling party name from LIDB 160, ISCP 150 may send a GDI Invoke Application response message 635, which includes the calling party name, to OSP 140 (block 570). In one embodiment, service logic in ISCP 150 may use a sending call variable mapping table to map a call variable value(s) from GR-1188 CNAM response message 630 to a tag value(s) in GDI Invoke Application response message 635. In another embodiment, the sending call variable mapping table may include the following exemplary fields: an application name field, an action identifier field, a received system identification field, and a tag identifier field. In other embodiments, the sending call variable mapping table may include different or additional fields.

The application name field may identify the application within ISCP 150 to which incoming GR-1188 CNAM response message 630 is directed. The action identifier field may identify the particular action requested (e.g., calling party name lookup). The received system identification field may identify the server (e.g., ISCP 150 or logic within ISCP 150) to which GR-1188 CNAM response message 630 is directed. The tag identifier field may store a value of a tag that may be included in an outgoing GDI Invoke Application response message 635. As an example, if the values of the application name, the action identifier, and the receiving system identifier of an incoming GR-1188 CNAM response message 630 match the values in the application name field, the action identifier field, and the received system identification field, respectively, of the sending call variable mapping table, ISCP 150 may include the value from the tag identifier field for that particular entry in the sending call variable mapping table into GDI Invoke Application response message 635.

In response to receiving GDI Invoke Application response message 635, OSP 140 may forward the calling party name to application server 130 via a SIP NOTIFY message 640 (or another type of SIP or non-SIP message (block 580). SIP NOTIFY message 640 may include the following exemplary format:

```
NOTIFY sip:as.example.com SIP/2.0
Via:SIP/2.0/UDP networkdevice.example.com:5060
From: <sip:osp.com>tag=78923
To: <sip:as.example.com>;tag=536157426-1045083194181
Call-Id: 1349882@cnam-lookup.example.com
CSeq: 20 NOTIFY
Contact: <sip:networkdevice.example.com>
Event: calling-name;id=6
Subscription-State: terminated
Content-Type: application/calling-name-info
Content-Length: 136
Max-Forwards:10
Calling-Name-Status: available
Calling-Name: "SMITH JOE"
<sip:+14125551234@as.example.com;user=phone>
Presentation-Indicator: allowed.
```

As illustrated in this exemplary message, SIP NOTIFY message 640 may include a calling name event type indication (which is "calling-name;id=6" in the above example). SIP NOTIFY message 640 may further include calling name status information, calling name information, and a calling name presentation indicator.

The calling name status information may indicate whether the calling name was available in GDI Invoke Application response message 635. If the calling name status indicates available, this may be an indication that the calling name was successfully retrieved and is included in the calling name field of SIP NOTIFY message 640. If the calling name status information indicates unavailable, this may be an indication that the calling name query was successfully performed, but the calling name is not stored in LIDB 160. If the calling name status information indicates out of service, this may be an indication that the calling name query was unable to be performed (e.g., the query timed out).

The calling name information may provide the name of the calling party. The calling name may be a name-address type format (or another format), where the calling name is included in the display-name portion of the name-address.

The calling name presentation indicator may indicate whether or not the calling name can be presented. The calling name presentation indicator may give LIDB 160 the ability to control the calling name presentation. For example, the calling name presentation indicator may specify that a retrieved calling name is not to be presented in, for example, those situations where the calling name is marked as private in LIDB 160.

As an alternative to sending SIP NOTIFY message 640, OSP 140 may, in an alternative embodiment where application server 130 and OSP 140 communicate via XML over HTTP, convert GDI Invoke Application response message 635 into an XML structure and send the XML structure over HTTP to application server 130. The XML structure may include some or all of the information described above with respect to SIP NOTIFY message 640. The conversion of the XML structure to GDI Invoke Application message 620 via, for example, a mapping processing.

In response to receiving SIP NOTIFY message 640, application server 130 may transmit a "200 OK" message 645 to OSP 140 to acknowledge receipt of SIP NOTIFY message 640. "200 OK" message 645 may include the following exemplary format:

```
SIP/2.0 200 OK
Via:SIP/2.0/UDP as.example.com:5060;branch=z9hG4bK-
BroadWorks.192.168.1.60-192.168.1.60V5060-0-703070627-536157426-
1045083194181;event=calling-name
From: <sip:as.example.com>;tag=536157426-1045083194181
To: <sip:osp.com>;tag=4442
Call-Id: 1349882@cnam-lookup.example.com
CSeq: 703070627 SUBSCRIBE
Contact: <sip:networkdevice.example.com>
Expires: 0
Content-Length: 0.
```

Further in response to receiving SIP NOTIFY message 640, application server 130 may provide a calling party name 650 to called party device 120 (block 590). Calling party name 650 may then be displayed by called party device 120 to a person answering called party device 120.

Figure 7:
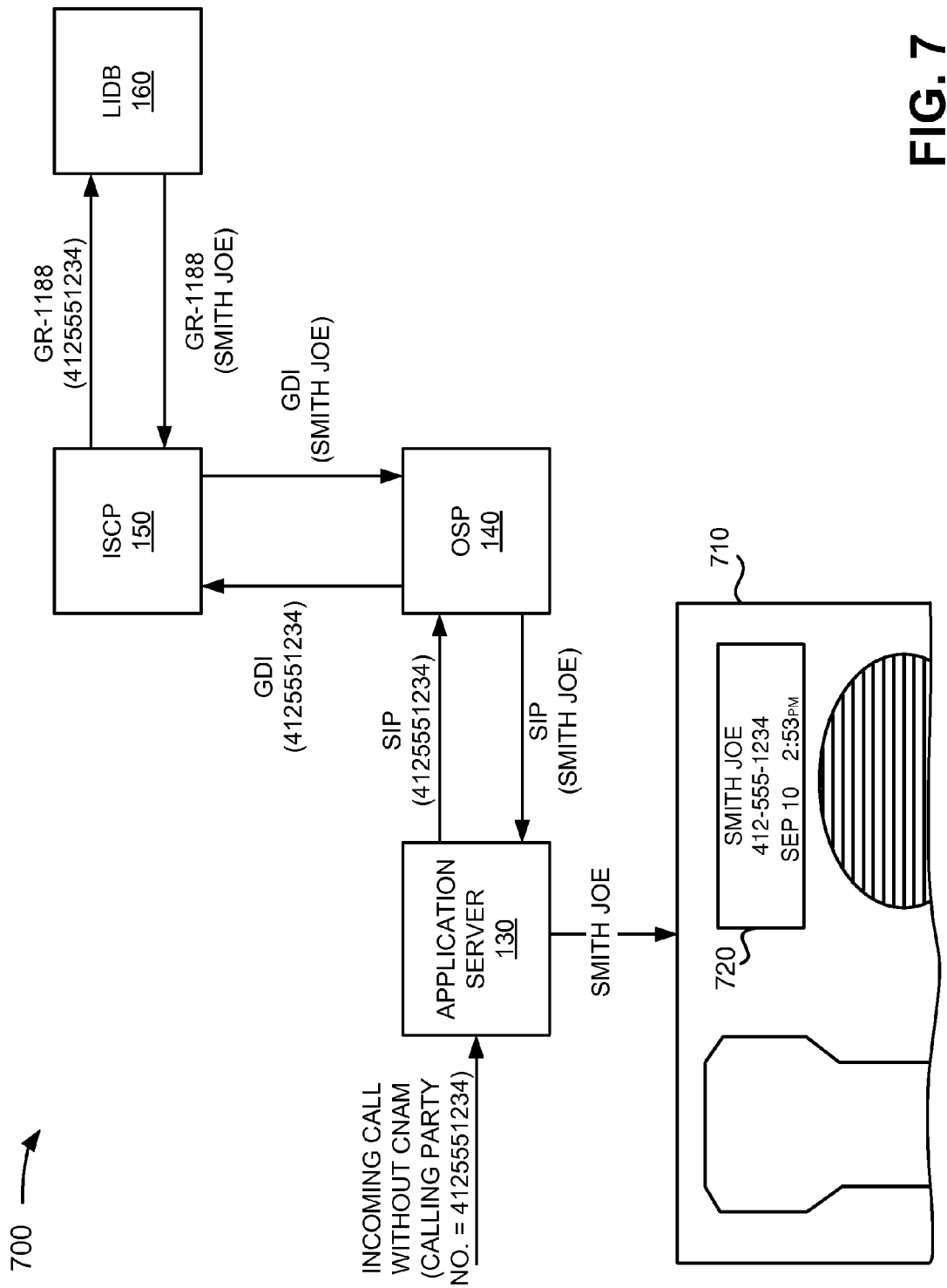
FIG. 7 illustrates an example of the processing described in FIG. 5.

The following example of FIG. 7 illustrates the processing described above with respect to FIG. 5. Assume, for this example, that application server 130 receives a telephone call, from a calling party at telephone number 4125551234, for a subscriber. Assume further that the telephone call does not include calling party name information and that the subscriber has a calling name feature enabled. As illustrated in FIG. 7, the subscriber may be associated with a telephone device 710 that may include a display 720 capable of displaying a telephone number and/or name of a party calling the subscriber.

Application server 130 may, upon receipt of the incoming telephone call (which, as described above, does not include calling party name information), send a SIP message to OSP 140 requesting that a calling party name lookup be performed for telephone number 4125551234. In response to receiving the SIP message, OSP 140 may send a GDI Invoke Application message to an appropriate ISCP 150 for invoking a calling party name lookup procedure on LIDB 160 for telephone number 4125551234. The GDI Invoke Application message from OSP 140 may cause ISCP 150 to perform the calling party lookup procedure on LIDB 160. To perform the procedure, ISCP 150 may send a GR-1188 query to LIDB 160 that may include the calling party telephone number 4125551234.

Assume that LIDB 160 successfully performs the calling party lookup procedure and identifies "SMITH JOE" as the name corresponding to telephone number 4125551234. LIDB 160 may send a GR-1188 response message to ISCP 150, which includes the calling party name "SMITH JOE."

ISCP 150 may send a GDI Invoke Application response message to OSP 140, which includes the calling party name "SMITH JOE." OSP 140 may convert the GDI Invoke Application response message to a SIP message and may send the SIP message, which includes the calling party name "SMITH JOE," to application server 130. Application server 130 may then send the calling party name "SMITH JOE" to telephone device 710 for display on display 720.

Embodiments described herein may provide calling party name information when such information is not included in a received telephone call.

The foregoing description provides illustration and description, but is not intended to be exhaustive or to limit the invention to the precise form disclosed. Modifications and variations are possible in light of the above teachings or may be acquired from practice of the invention. For example, while a series of acts has been described with respect to FIG. 5, the order of the acts may be varied in other implementations consistent with the invention. Moreover, non-dependent acts may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a server, a telephone call request for a subscriber,
   the telephone call request including a telephone number associated with a calling party, and
   the telephone call request omitting a calling party name of the calling party;
   retrieving, by the server, the calling party name from a repository of calling party names based on the telephone number associated with the calling party; and
   providing, by the server, the calling party name to a device associated with the subscriber.

2. The method of claim 1, where retrieving the calling party name includes:
   prompting sending of a first message from an Open Services Platform,
   the first message including the telephone number associated with the calling party, and
   receiving a second message that includes the calling party name.

3. The method of claim 2,
   where prompting the sending of the first message includes:
      sending, by the server, a third message to the Open Services Platform,
      generating, by the Open Services Platform, the first message based on the third message,
         the third message including the telephone number associated with the calling party,
      sending the first message from the Open Services Platform to an Integrated Service Control Point, and
   where receiving the second message includes:
      receiving, from the Integrated Service Control Point, a fourth message that includes the calling party name,
      mapping, by the Open Services Platform, the fourth message to the second message, and
      receiving, by the server, the second message from the Open Services Platform.

4. The method of claim 2,
   where the first message includes a Generic Data Interface (GDI) Invoke Application message, and
   where the second message includes a GDI Invoke Application response message.

5. The method of claim 2, where receiving the second message includes:
   sending, by an Integrated Service Control Point and based on the first message, a calling party name query to the repository of calling party names,
      the calling party name query including the telephone number associated with the calling party,
   receiving, from the repository of calling party names, the calling party name,
   sending, by the Integrated Service Control Point, a third message that includes the calling party name to the Open Services Platform, and
   sending, based on the third message, the second message to the server.

6. The method of claim 5, where the calling party name query includes a GR-1188 calling party name query.

7. The method of claim 1, where the repository of calling party names includes a Public Switched Telephone System-based Line Information Database.

8. A method comprising:
   receiving, by one or more devices, a telephone call request for a user,
      the telephone call request omitting a name of a calling party who is calling the user;
   determining, by the one or more network devices, that the user has a calling party name feature enabled,
      the calling party name feature being enabled indicating that the name of the calling party is to be provided to a device associated with the user;
   obtaining, by the one or more network devices and based on determining that the user has the calling party name feature enabled, the name of the calling party; and
   providing, by the one or more devices, the name of the calling party to the device associated with the user.

9. The method of claim 8, where obtaining the name of the calling party includes:
   sending, to an Open Services Platform, a Session Initiation Protocol (SIP) request for the name of the calling party,
      the SIP request including a telephone number associated with the calling party, and
   receiving, from the Open Services Platform, a message that includes the name of the calling party.

10. The method of claim 8, where obtaining the name of the calling party includes:
sending an eXtensible Markup Language (XML) request for the name of the calling party,
the XML request including a telephone number associated with the calling party, and
receiving, from the Open Services Platform, a message that includes the name of the calling party.

11. The method of claim 8, where the user is a Voice over Internet Protocol (VoIP) user.

12. The method of claim 8, where obtaining the name of the calling party includes:
obtaining the name of the calling party from a Public Switched Telephone Network (PSTN) based repository of calling party names.

13. A system comprising:
an Open Services Platform to:
receive a first message from a server after the server determines that a particular feature is enabled for a first party,
the particular feature being enabled indicates that a calling party name, of a second party that is calling the first party, is to be provided to a device associated with the first party, and
the first message including a request for the calling party name,
send, based on the first message, a second message to an Integrated Service Control Point,
receive a third message from the Integrated Service Control Point,
the third message including the calling party name, and
send, based on a third message, a fourth message for providing the calling party name to the device associated with the first party.

14. The system of claim 13, where the first message includes a Session Initiation Protocol (SIP) message.

15. The system of claim 13, where the first message includes an eXtensible Markup Language (XML) structure.

16. The system of claim 13, where the second message includes a Generic Data Interface (GDI) Invoke Application message.

17. The system of claim 13, where the Integrated Service Control Point is to:
retrieve, based on the second message, the calling party name from a Public Switched Telephone System-based storage component.

18. The method of claim 1, further comprising:
determining, before retrieving the calling party name, that a particular feature is enabled for the subscriber,
the particular feature being enabled indicates that the calling party name is to be provided to the device associated with the subscriber.

19. The method of claim 1, where the subscriber is a Session Initiation Protocol (SIP) subscriber.

* * * * *